United States Patent [19]

Weeder

[11] Patent Number: 4,732,036
[45] Date of Patent: Mar. 22, 1988

[54] AUTOMATIC TRANSMISSION TEST APPARATUS

[76] Inventor: Allen F. Weeder, 4618 30th Ave., Columbus, Nebr. 68601

[21] Appl. No.: 732,678
[22] Filed: May 10, 1985
[51] Int. Cl.⁴ ............................................. G01M 15/00
[52] U.S. Cl. ..................................................... 73/118.1
[58] Field of Search ................ 73/118, 168, 862, 118.1

[56] References Cited

U.S. PATENT DOCUMENTS

| | | |
|---|---|---|
| 3,016,740 | 1/1962 | Raidl . |
| 3,060,730 | 10/1962 | Lucia . |
| 3,075,381 | 1/1963 | Lelis . |
| 3,130,580 | 4/1964 | Lelis . |
| 4,356,724 | 11/1982 | Ayoub et al. . |
| 4,520,659 | 6/1985 | Lucia et al. ........................... 73/118 |

Primary Examiner—Jerry W. Myracle
Attorney, Agent, or Firm—Zarley, McKee, Thomte Voorhees & Sease

[57] ABSTRACT

An automatic transmission test apparatus includes an elongated main frame having a pair of inertia wheels supported at opposite ends of the frame for rotation about a longitudinal axis. An upstanding headstock frame on the main frame between the inertia wheels, supports an automotive engine and an automatic transmission in driven relation with the engine. The engine and transmission are so supported that their position can be vertically, transversely and rotationally adjusted for aligning the transmission outputs with the longitudinal axis of rotation of the inertia wheels. A jack shaft runs the length of the main frame for disengageably timing the inertia wheels for rotation in unison. Transmission fluid is stored within the main frame and pumped to a transmission through a dual filter system for reuse of the fluid. Brakes associated with the inertia wheels are operable by either of dual pedals provided on opposite sides of the main frame for convenient testing by an operator situated on either side.

12 Claims, 8 Drawing Figures

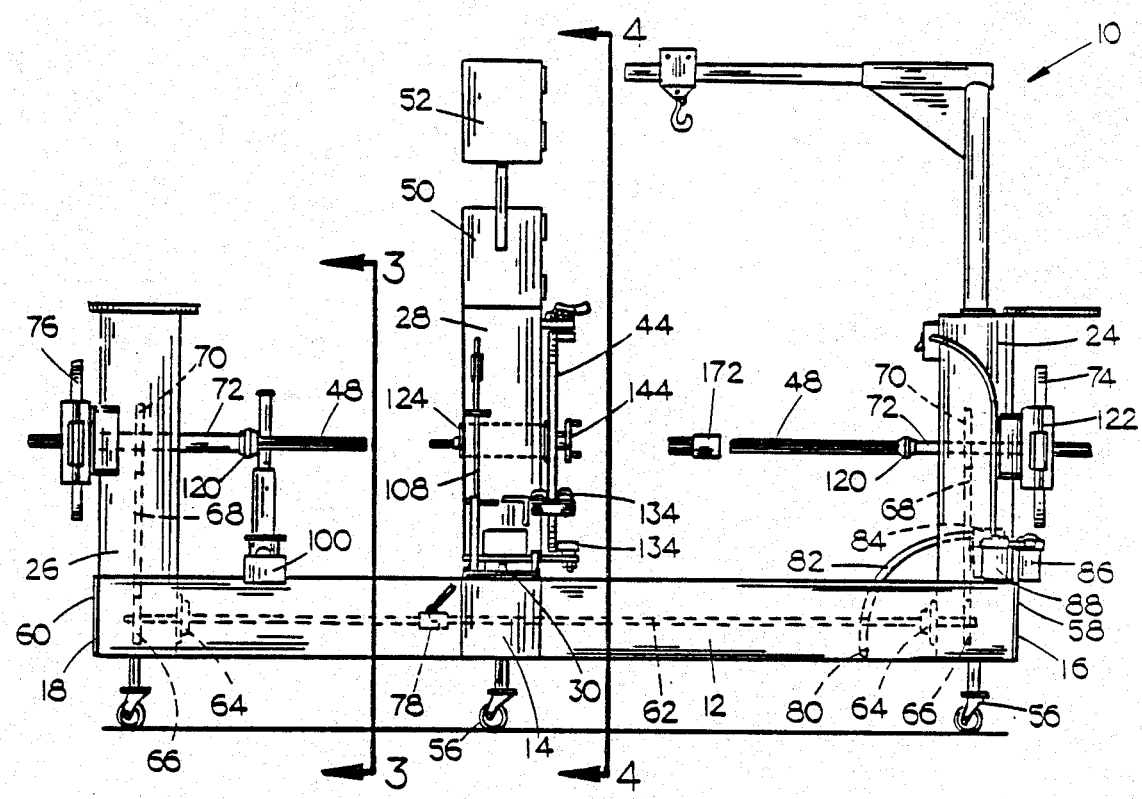
FIG. 2
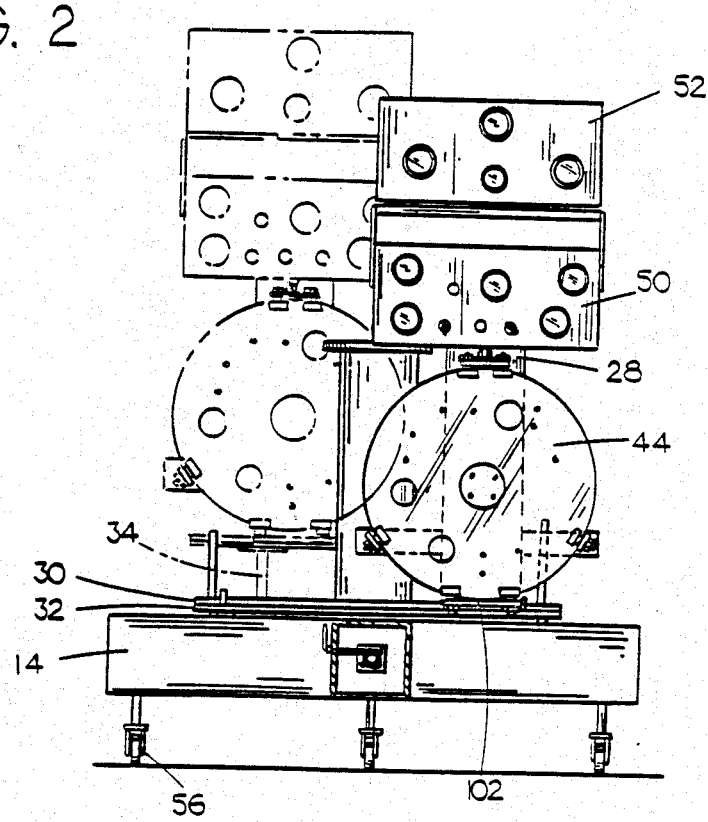
FIG. 3
FIG. 4

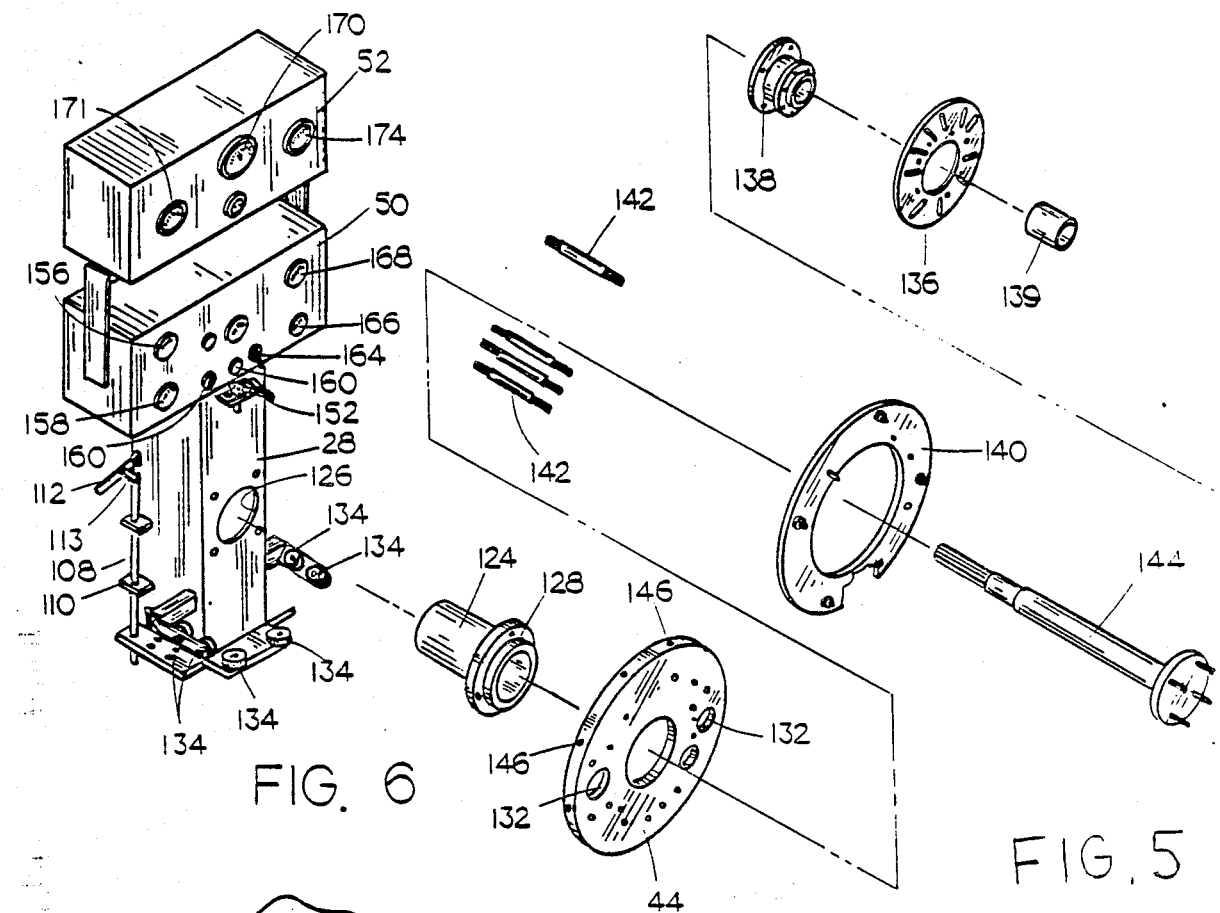
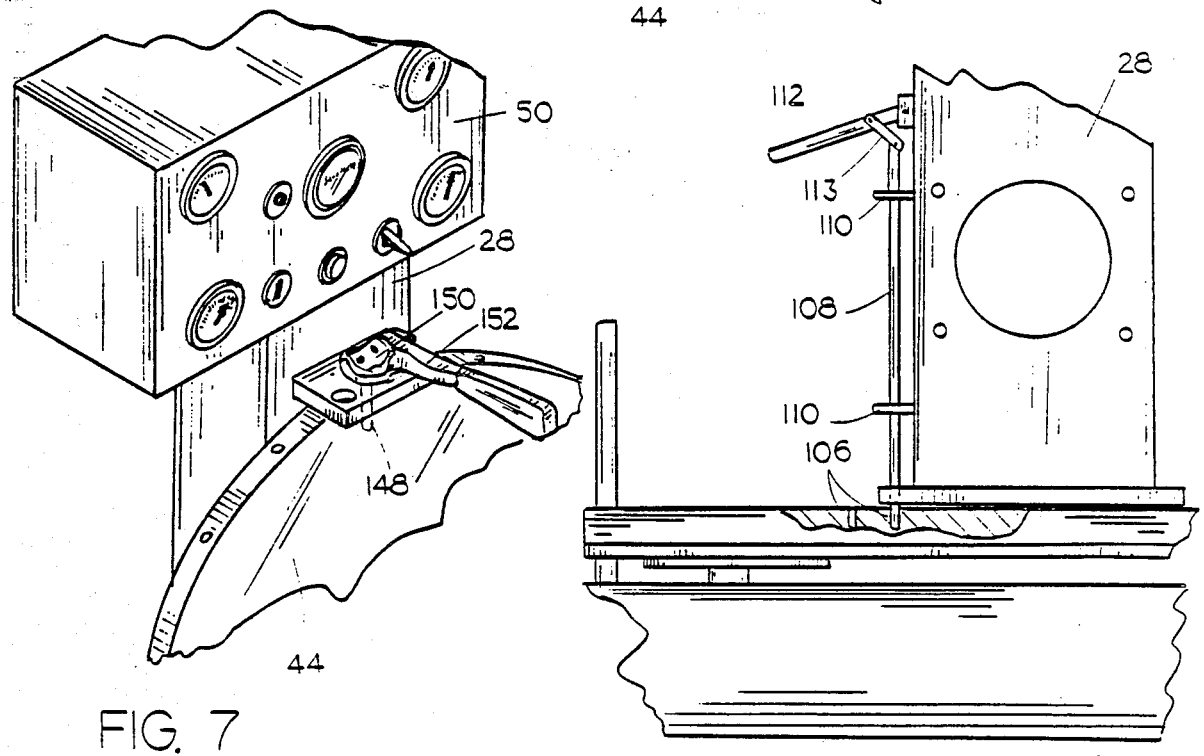
FIG. 6
FIG. 5
FIG. 7
FIG. 8

AUTOMATIC TRANSMISSION TEST APPARATUS

BACKGROUND OF THE INVENTION

The present invention is directed generally to an apparatus for testing automotive automatic transmissions in a shop environment prior to installation into a vehicle. More specifically, the invention is directed to a transmission test stand on which an automatic transmission may be connected in driven relation to an automotive engine and in driving relation to an inertia wheel equipped with a brake for simulating driving conditions in an automobile.

Automatic transmission test stands have previously been known but all have had certain limitations either on how the transmission is supported or to the types of transmissions which could be tested. For example, Ayoub et al U.S. Pat. No. 4,356,724 discloses a test stand wherein the automatic transmission is rigidly mounted and therefore incapable of rotation for fluid drainage, small repairs and the like. Furthermore, the electric motor drive for that test stand is believed to produce a different response than actual driving conditions, particularly as to deceleration. Raidl U.S. Pat. No. 3,016,740 shows an automatic transmission test stand wherein the transmission can be rotated on the stand but this unit is adapted for testing only conventional rear wheel drive transmissions.

Other known test stands are limited for use with the now common right-hand drive transmissions only.

Accordingly, a primary object of the invention is to provide an improved automatic transmission test unit.

A more specific object is to provide an automatic transmission test unit having the capability of adjusting the position of the transmission thereon to accommodate testing of right hand, left hand and center drive transmissions.

Even more specifically, it is an object to provide an automatic transmission test stand wherein the position of the transmission may be adjusted vertically and transversely for aligning the transmission output with the axis of rotation of the inertia wheel(s) of the test unit.

A further object is to provide an automatic transmission test stand capable of testing both the front and rear wheel drive transmissions.

Another object is to provide an automatic transmission test stand wherein the pair of inertia wheels for connection to the front and rear wheel drive outputs of a transmission may be disengageably mechanically coupled together for rotation in unison to simulate actual driving conditions.

A further object is to provide an automatic transmission test unit including a transmission fluid reservoir and a dual filter pump system for reuse of the fluid therein.

SUMMARY OF THE INVENTION

The automatic transmission test apparatus of the present invention includes an elongated main frame having a pair of inertia wheels supported at opposite ends of the frame for rotation about a longitudinal axis. An upstanding headstock frame on the main frame, between the inertia wheels, supports an automotive engine and an automatic transmission in driven relation with the engine. The engine and transmission are so supported that their position can be both vertically and transversely adjusted for aligning the transmission outputs with the longitudinal axis of rotation of the inertia wheels. A length adjustable coupling mechanism provides for connection of the transmission output(s) to the inertia wheel(s). This capability of adjusting both the vertical and transverse position of a transmission to be tested allows the single test unit of the invention to be readily adapted for testing transmissions of the right-hand drive, left-hand drive and center drive type. Likewise, the provision of a pair of inertia wheels at opposite ends of the test unit readily accommodates the automatic transmissions of front wheel drive or rear wheel drive.

A jack shaft running the length of the main frame of the unit is drivingly connected to both inertia wheels for timing the wheels for rotation in unison. A clutch on the jack shaft enables disconnection between the inertia wheels when only one is required.

Automatic transmission fluid for testing purposes is stored in an internal reservoir within the main frame. A pump is provided for directing fluid through a dual filter system, consisting of a coarse screen and finer filter, then through a flexible hose for filling the transmission. The rotary turret plate support of the transmission unit enables it to be easily inverted for draining fluid back to the main frame reservoir through a drip pan situated directly below the transmission.

Brakes are provided on the inertia wheels to further simulate actual driving conditions. Dual brake pedals are provided on opposite sides of the main frame for convenient testing by an operator situated on either side. A lift boom is provided on the main frame for conveniently raising and lowering a transmission into and from an installed position on the test unit.

BRIEF DESCRIPTION OF THE DRAWINGS

FIG. 2 is an upright side elevational view of the test apparatus with the engine, transmission, inertia wheel covers and drip pan removed therefrom;

FIG. 3 is a partially sectional end view taken along line 3—3 in FIG. 2;

FIG. 4 is another partially sectional end view taken along line 4—4 in FIG. 2 with dotted lines indicating an adjusted position of the headstock frame;

FIG. 5 is a partially exploded perspective view of the test unit, with portions removed for clarity;

FIG. 6 is an exploded perspestive view of the headstock frame and transmission mounting structure of the invention;

FIG. 7 is an enlarged partial detail perspective view of the turret plate locking mechanism; and FIG. 8 is an enlarged partially sectional end view showing the lock pin structure for the headstock frame and subframe.

DESCRIPTION OF THE PREFERRED EMBODIMENT

Figure 1:
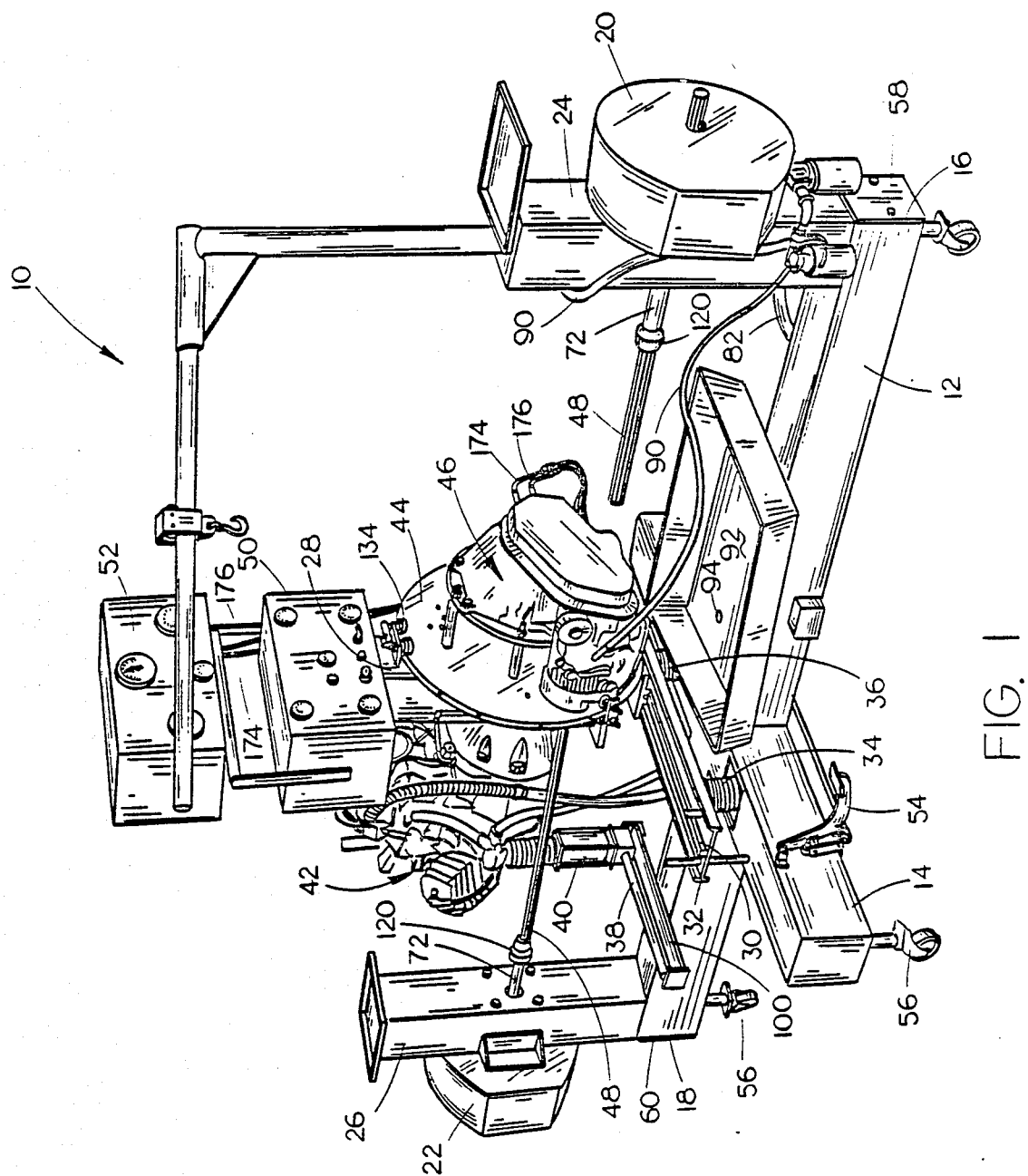
FIG. 1 is a perspective view of the automatic transmission test apparatus of the invention.

In broad overview, the automatic transmission test unit in of the present invention is shown in FIG. 1 as including an elongated main frame 12 having a "T" or cross member 14 situated intermediate the opposite ends 16 and 18 wherein primary and secondary inertia wheels are rotatably supported within respective housings 20 and 22 on main frame pedestals 24 and 26.

An upright headstock frame 28 is supported on the main frame 12 between pedestals 24 and 26 with freedom of transverse sliding movement on a transversely extended primary track 30 on the generally horizontal headstock subframe 32. The headstock subframe 32 is supported by a pair of lift jacks 34 and 36 for vertical adjustment of the headstock frame 28. Another secondary slide track 38 supports a third lift jack 40 to provide added support for an automotive engine 42 mounted on one side of the headstock frame 28.

The opposite side of the headstock frame 28 is provided with a rotatable turret plate 44 to which an automatic transmission 46 to be tested is connected with suitable adapters. The turret plate 44 is rotatable on the headstock frame 28 which, in turn, is transversely and vertically adjustable on the main frame 12 by track 30 and lift jacks 34 and 36 so that the transmission 46 may be positioned with the rotary output thereof in alignment with a fly wheel drive shaft 48 to which it is connected by a suitable coupler. Thus the test unit can be adjusted to accommodate automatic transmissions of the left hand drive, right hand drive, or conventional center drive type.

At the top of the headstock frame 28, there is situated a control panel 50 for operating engine 42 and a test gauge panel 52 for the various tests on the transmissions 46. Brakes are provided on each of the inertia wheels, which brakes are jointly operated by a pair of interconnected pedals 54 on opposite sides of the main frame 12.

Referring to FIG. 2, it is seen that main frame 12 is supported on caster wheels 56 for portability. The main frame includes a length of square tubing open at the ends but closed by end plates 58 and 60 in fluid tight relation to thereby serve as the transmission fluid reservoir. An elongated jack shaft 62 is mounted within the main frame 12 by suitable bearings 64 and runs the length of the main frame. Pulleys 66 on opposite ends of jack shaft 62 are connected by belts 68 to similar pulleys 70 on the respective inertia wheel shafts 72 so that the primary and secondary inertia wheels 74 and 76 may be mechanically timed and interconnected for rotation in unison. A clutch 78 on jack shaft 62 is manually disengageable for operation of a single fly wheel when testing a transmission having only a front wheel drive or rear wheel drive output.

The transmission fluid delivery system for the test unit is seen in FIGS. 1 and 2. Transmission fluid is drawn from reservoir 12 through outlet 80 and conduit 82 by an electric pump 84 on the backside of pedestal 24, whereupon the fluid is pumped through a coarse screen filter 86 and a second finer filter 88, for example with a micron element, to a delivery hose 90 for filling a transmission. Once tests are completed, the transmission filler plug is removed, the turret plate is rotated to invert the transmission whereupon the fluid is drained into tray 92 which communicates with the reservoir through a drain hole 94 (FIG. 1) and reservoir filler hole 96 (FIG. 5).

FIG. 3 illustrates both solid and dotted line positions for the third lift jack 40 to show both the transverse and vertical adjustability thereof. Lift jack 40 is transversely slidable on the secondary slide track 38 which is fixed on a mounting plate 98 (FIG. 5) for attachment to a subframe cross member 100 on main frame 12. Each lift jack includes an electric motor and worm type gearing for vertical adjustability of the respective tracks to which it is connected.

FIG. 4 illustrates both solid and dotted line positions for the headstock frame 28 to illustrate both the transverse and vertical adjustability thereof. As shown in best in FIG. 1, the base of the headstock frame 28 is provided with a track follower plate 102 which rides on primary track fixed to the headstock subframe 32 (FIG. 5). Also mounted on subframe 32 in parallel relation to primary track 30 in a lock pin receiving bar 104 having various holes 106 in the top surface thereof for receiving a vertically adjustable lock pin 108, as shown best in FIG. 8. The lock pin is supported in slide brackets 110 and is raised and lowered by a manual lever 112 connected to the pin by link 113. Thus, upon transverse movement of the headstock frame 28 to the desired position, the lock pin 108 is lowered into the aligned hole therefor to maintain the selected position for the headstock frame.

Also in FIG. 5, it is seen that the primary track subframe 32 is provided with holes registrable with mounting holes in lift jack plates 112 and 114 on lift jacks 34 and 36 for vertical adjustment of the headstock frame. Subframe 32 is also provided with holes 116 for vertical sliding movement on upright guide posts 118.

In FIGS. 2, 3 and 5, it is seen that each inertia wheel 74 and 76 is rotatably supported on an inertia wheel shaft 72 through which an inertia wheel drive shaft 48 is axially slidable and securable thereto by quick disconnect couplers 120. A brake caliper 122 on each pedestal disengageably grips the inertia wheel for applying a braking force in response to depression of the brake pedals 54 to which the caliper is connected by conventional brake lines. The second caliper 122 in FIG. 5 is not necessary.

FIG. 6 illustrates the connection of a transmission to the headstock frame 28.

First, a generally cylindrical main frame housing 124 is inserted through registered openings 126 in opposite faces of the headstock frame 28 and a flange 128 on housing 124 is secured to the headstock frame by fasteners inserted through registered holes provided therefor. The end of the main frame housing 124 facing the engine is secured to the engine bell housing.

Rotatably supported on the opposite transmission end of the main frame housing 124 is a large turret plate 44 having a plurality of large holes 132 for passage of a fly wheel drive shaft 48 therethrough and a plurality of smaller holes to accommodate connection to various transmission adapter plates.

The turret plate 44 is axially secured on the main frame housing 124 by a plurality of roller guides. Rollers are provided at the 12:00, 4:00, 6:00 and 8:00 positions as seen in FIG. 6. At the 12:00 and 6:00 positions, a pair of rollers 134 bear against the outer surface of the turret plate. At the 4:00 and 8:00 positions, a pair of radially spaced-apart guide rollers bear against opposite surfaces of the turret plate to fix the axial position thereof.

Next, the proper converter flex plate 136 is mounted with a generally cylindrical adapter 138 to the main drive shaft 144. A couple of converter flex plates 136 may be provided, one for front wheel drive and one for rear wheel drive, which plates differ somewhat in diameter. Next the proper transmission face plate 140 is installed onto the turret plate 44 with adapter pins 142 whereby the face plate is thus supported in spaced-apart relation from the turret plate. The main drive shaft 144 is inserted through the main drive housing 124 into driving engagement with the engine 42.

The turret plate 44 is then rotated to the proper position for receiving the transmission. For this purpose, the turret plate is provided with a plurality of radial holes 146 in the outer periphery thereof which are alignable with a vertical adjustable turret plate lock pin 148 shown in FIG. 7. The lock pin is connected by a link 150 to a manual lever 152 for up and down vertical movement in response to up and down pivotal movement of the lever 152.

Upon setting the turret plate in a proper position, the transmission 46 is installed onto the face plate 140 and is fastened with the proper bolts.

In order to adapt the test unit 10 for anyone of the various late model automatic transmissions used on foreign and domestic cars, eight specifications are needed. These may be provided in chart form so that the operator need only look up the proper transmission whereupon the eight specifications will be set forth. Those specifications are as follows:

(1) Proper unit adapter 172 (FIG. 2) for coupling the inertia wheel drive shaft(s) to the transmission.
(2) Proper converter flex plate 136.
(3) Proper converter adapter sleeve 139 and studs.
(4) Proper transmission face plate 140.
(5) Vertical headstock position.
(6) Transverse headstock position.
(7) Jack shaft clutch position.

Whereas only a single converter flex plate 136, adapter 138 and face plate 140 are shown in FIG. 6, it is apparent that several of each of these may be required to accommodate all of the late model automatic transmissions. Additional ones may have to be provided to accommodate transmissions yet to be developed. Likewise, additional peripheral holes may be required in the turret plate and additional position holes 106 may be required for the lock pin receiving bar 104 of the primary track 30 to accommodate particular additional transmissions.

During testing, the engine is controlled from the engine panel 50 on top of the headstock frame 28. Engine panel 50 includes oil gauge 156, amp gauge 158, ignition key 160, starter button 162, throttle 164, vacuum gauge 166, and temperature gauge 168.

Likewise, the test gauge panel 52 includes a pressure gauge 170 for line pressure, a transmission temperature gauge 172 and an engine tachometer 174.

In operation, the operator first determines which transmission is to be tested. Next, he checks the chart to determine the applicable specifications referred to above.

At the test unit 10, the headstock frame 28 is horizontally positioned by raising the lock pin 108, sliding the frame to the proper position and lowering the lock pin 108 into the registered hole 106. Next the proper converter flex plate 136 and adapters are installed on the main drive shaft 144. The proper face plate is then secured to the turret plate 44 with the proper adapter pins 142. Next, the turret plate is rotated to the proper position whereupon the turret plate lock pin 148 is lowered into the registered hole 146 to keep the turret plate from turning.

The transmission unit 46 is then installed on the face plate 140 with proper bolts. A suitable output coupler 172, shown in FIG. 2, is then installed. The splined male end fits into the rotary output of the transmission and the female end receives the inertia wheel drive shaft 48.

The headstock frame 28 is then vertically positioned by electrically actuating the left jacks 34, 36 and 40 with a toggle switch on the test gauge panel to align the output couplers 172 with the inertia wheel drive shafts 48. For this purpose, the couplers 120 allow the drive shafts 48 to be axially adjusted relative to the respective inertia wheel shaft 72.

Hydraulic lines 174 and 176 from the test panel 52 are then connected to the transmissiono 46. Finally, the transmission is filled with fluid from the reservoir 12 with the delivery hose 90.

The transmission 46 is then ready for testing. The engine 42 is started and the transmission is conventionally tested to check hydraulic pressures, shift points, leaks and any abnormal noises. If minor repairs are necessary, they may be performed on the test strand by rotating the turret plate to afford access to the transmission. After the repairs are completed, the turret plate is rotated back to the test position for retesting of the unit.

If the unit tests satisfactorily, the transmission is then removed from the test apparatus 10 as follows. Excess oil is drained from the unit by rotating the turret plate to drain oil from the fill hole to the drip pan 92. The turret plate is then rotated back to the test position, whereupon hydraulic lines are disconnected, the drive axles 48 are withdrawn to the inertia wheels upon releasing couplers 120. The transmission is then unbolted from the face plate 140 and removed.

During testing, the inertia wheel clutch 78 is disengaged for tests requiring only a single inertia wheel and engaged for test requiring both inertia wheels.

The three-dimensional adjustability of the transmission supporting structure readily adapts the test unit of the invention for testing any transmission, be it right-hand drive, left-hand drive or conventional center drive. The primary and secondary tracks 30 and 38 affords transverse adjustment; the lift jacks 34, 36 and 40 afford vertical adjustment and the turret plate 130 affords rotational adjustment. The result of these adjustments is that the transmission output or outputs for a rear-wheel drive or a front-wheel drive transmission is aligned with the inertia wheel drive shafts to thereby eliminate any imbalance and vibrations associated with skewed shafts.

Thus there has been shown and described an automatic transmission test apparatus which accomplishes at least all of the stated objects.

I claim:

1. A transmission test unit, comprising,
an elongated main frame having opposite ends,
an inertia wheel,
means for supporting said inertia wheel on said main frame for rotational movement about a longitudinal axis,
an upstanding headstock frame on said main frame in longitudinally spaced relation from said inertia wheel,
means for supporting an automotive engine on said headstock frame,
means for supporting an automatic transmission on headstock frame in driven relation with an engine supported thereon, said transmission having a rotary input and output,
means on said headstock frame for providing for transverse movement of an engine and transmission supported thereon to selected transverse positions relative to said main frame,
means on said headstock frame for providing for vertical movement of an engine and transmission supported thereon to selected vertical positions relative to said main frame,
disengageable coupling means for drivingly connecting a transmission rotary output to said inertia wheel, said headstock frame, upon mounting an automotive transmission thereon, being transversely and vertically adjustable to a position wherein the transmission output is in longitudinal alignment with the inertia wheel axis, a second inertia wheel, means for supporting said second inertia wheel on said main frame in longitudinally spaced relation from the aforementioned inertia wheel with the headstock frame disposed therebetween, and means, independent of a transmission supported on said headstock frame, for disengageably coupling said inertia wheels for rotation in unison.

2. The transmission test unit of claim 1 wherein the second inertia wheel is supported for rotation about a longitudinal axis in alignment with the axis of rotation for the aforementioned inertia wheel.

3. The transmission test unit of claim 1 wherein a transmission supported on said headstock frame has a second rotary output and further comprising disengageable coupling means for drivingly connecting the transmission second rotary output to said second inertia wheel.

4. The transmission test unit of claim 1 wherein said disengageable coupling means includes a clutch whereby said coupling means may be disengaged for rotation of either inertia wheel independent of the other.

5. The transmission test unit of claim 1 further comprising a pivotal lift boom associated with said main frame for lifting transmissions into place for support on said headstock frame.

6. A transmission test unit, comprising, an elongated main frame having opposite ends, an inertia wheel, means for supporting said inertia wheel on said main frame for rotational movement about a longitudinal axis, an upstanding headstock frame on said main frame in longitudinally spaced relation from said inertia wheel, means for supporting an automotive engine on said headstock frame, means for supporting an automatic transmission on headstock frame in driven relation with an engine supported thereon, said transmission having a rotary input and output, means on said headstock frame for providing for transverse movement of an engine and transmission supported thereon to selected transverse positions relative to said main frame, means of said headstock frame for providing for vertical movement of an engine and transmission supported thereon to selected vertical positions relative to said main frame, disengageable coupling means for drivingly connecting a transmission rotary output to said inertia wheel, said headstock frame, upon mounting an automotive transmission thereon, being transversely and vertically adjustable to a position wherein the transmission output is in longitudinal alignment with the inertia wheel axis, and said means for supporting an automotive transmission on said headstock frame comprising a turret plate rotatably supported on said headstock frame, said transmission being secured to said turret plate for rotation from an operating position to selected rotational positions for service and fluid drainage, and means for disengageably locking the turret plate in a position corresponding to the operating position for the transmission.

7. The transmission test unit of claim 6 further comprising a transmission fluid reservoir, a flexible fluid delivery hose in communication with said reservoir for delivering fluid to a transmission mounted on the headstock frame, a fluid pump in operative communication with said hose and a pair of filters including a coarse and fine filter in communication with said hose whereby transmission fluid stored in said reservoir may be reused.

8. The transmission test unit of claim 7 further comprising a fluid drain pan on said main frame below said transmission for collecting fluid drained therefrom, and drain means from said pan to said reservoir.

9. The transmission test unit, comprising, an elongated main frame having opposite ends, an inertia wheel, means for supporting said inertia wheel on said main frame for rotational movement about a longitudinal axis, an upstanding headstock frame on said main frame in longitudinally spaced relation from said inertial wheel, means for supporting an automotive engine on said headstock frame, means for supporting an automatic transmission on headstock frame in driven relation with an engine supported thereon, said transmission having a rotary input and output, disengageable coupling means for drivingly connecting a transmission rotary output to said inertial wheel, said headstock frame, upon mounting an automotive transmission thereon, being transversely and vertically adjustable to a position wherein the transmission output is in longitudinal alignment with the inertia wheel axis, a second inertia wheel and means for supporting said second inertia wheel on said main frame in longitudinally spaced relation from the aforementioned inertia wheel with the headstock frame disposed therebetween, the second inertia wheel being supported for rotation about a longitudinal axis in alignment with the axis of rotation for the aforementioned inertia wheel, and means independent of a transmission supported on said headstock frame, for disengageably coupling said inertia wheels for rotation in unison.

10. A transmission test unit, comprising, an elongated main frame having opposite ends, an inertia wheel, means for supporting said inertia wheel on said main frame for rotational movement about a longitudinal axis, an upstanding headstock frame on said main frame in longitudinally spaced relation from said inertia wheel, means for supporting an automotive engine on said headstock frame, means for supporting an automatic transmission on said headstock frame in driven relation with an engine supported thereon, said transmission having a rotary input and output, a second inertia wheel, means for supporting said second inertia wheel on said frame in longitudinally spaced relation from the aforementioned inertia wheel with the headstock frame disposed therebetween, means independent of a transmission, supported on said headstock frame, for disengeably coupling said inertia wheels for rotation in unison.

11. The transmission test unit of claim 10, wherein said headstock frame is transversely adjustable.

12. The transmission test unit of claim 10, wherein said headstock frame is vertically adjustable.

* * * * *